United States Patent [19]

Nekola

[11] Patent Number: 5,082,049

[45] Date of Patent: Jan. 21, 1992

[54] HEAT GENERATOR FOR USE WITH AN ABSORPTION AIRCONDITIONING SYSTEM FOR AUTOMOBILES

[75] Inventor: Frank F. Nekola, Trenton, Fla.

[73] Assignee: Robert R. Pisano, Franklin Park, Ill.; a part interest

[21] Appl. No.: 612,254

[22] Filed: Nov. 13, 1990

[51] Int. Cl.⁵ .................. F25B 27/02; F25B 15/00; F28F 13/00; F28F 27/00

[52] U.S. Cl. ........................... 165/32; 165/41; 165/42; 165/86; 165/96; 62/323.2; 62/239; 62/238.3

[58] Field of Search ............ 165/42, 43, 41, 86, 165/96, 32; 60/298; 62/239, 323.2, 383, 238.3, 238.4

[56] References Cited

U.S. PATENT DOCUMENTS

| | | | |
|---|---|---|---|
| 2,068,333 | 1/1937 | Krummell | 62/238.3 |
| 2,077,625 | 4/1937 | Higgins | 165/96 |
| 2,136,626 | 11/1938 | Lind | 165/96 |
| 2,953,907 | 9/1960 | De Cicco et al. | 62/238.3 |
| 3,142,161 | 7/1964 | House | 62/239 |
| 3,357,413 | 12/1967 | Quinton | 165/96 |
| 3,554,849 | 1/1971 | Wagerer | 62/238.4 |
| 3,661,200 | 5/1972 | McNamara | 165/42 |
| 4,238,187 | 12/1980 | Euskirchen | 165/96 |
| 4,341,088 | 7/1982 | Mei et al. | 62/323.2 |
| 4,538,424 | 9/1985 | Meyers | 62/238.3 |
| 4,815,525 | 3/1989 | Readman | 165/86 |

FOREIGN PATENT DOCUMENTS

| | | | |
|---|---|---|---|
| 2432285 | 1/1976 | Fed. Rep. of Germany | 60/298 |
| 3207383 | 9/1983 | Fed. Rep. of Germany | 165/43 |
| 952299 | 3/1964 | United Kingdom | 165/96 |

Primary Examiner—John Ford

[57] ABSTRACT

A heat generating apparatus and system for an automobile and incorporating the use of an absorption air conditioning system including temperature control means is disclosed. Heat transfer from the catalytic converter by means of a circulating heating fluid to a heating coil attached to the heat generator on the absorption system is provided as well as electrical connectons and controls for utilizing the heat energy from the catalytic converter. The use of a compressor and horsepower drain on the engine is eliminated.

4 Claims, 1 Drawing Sheet

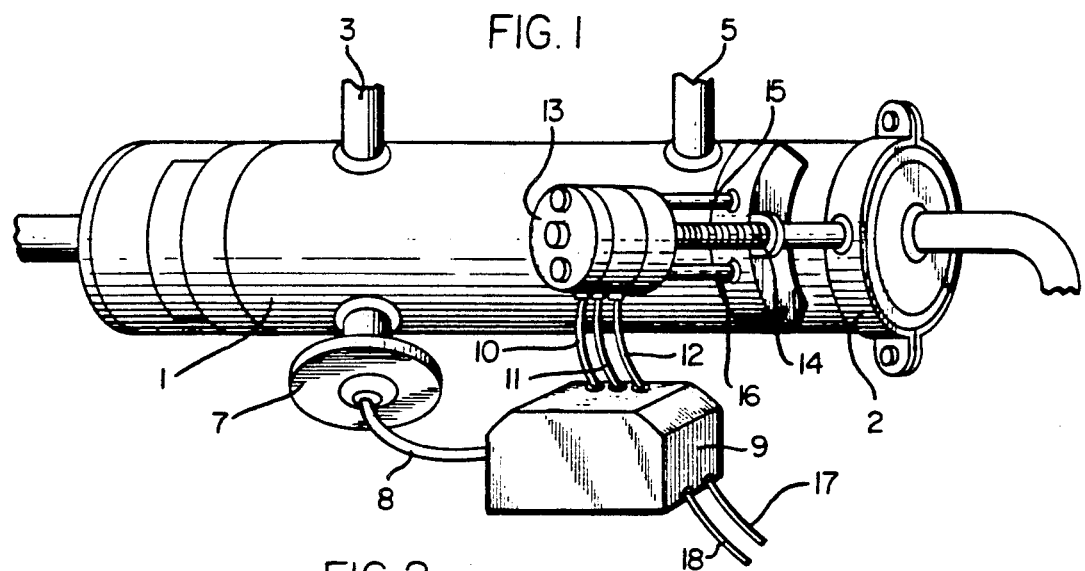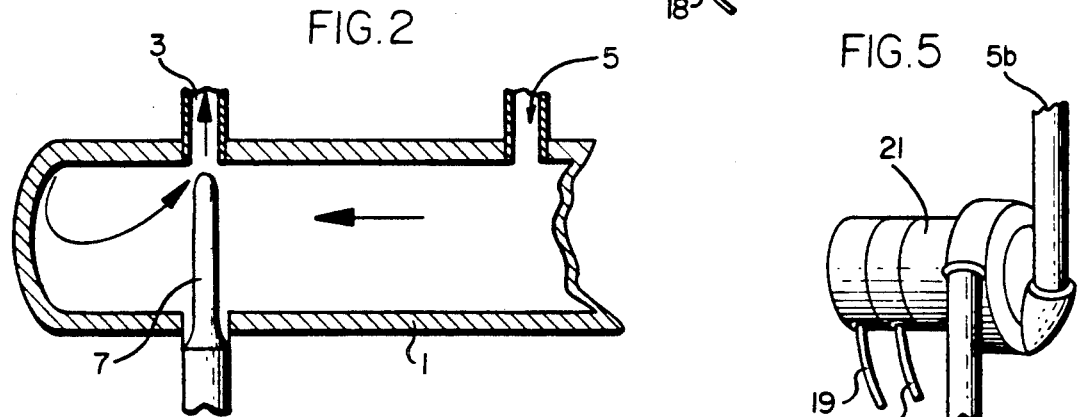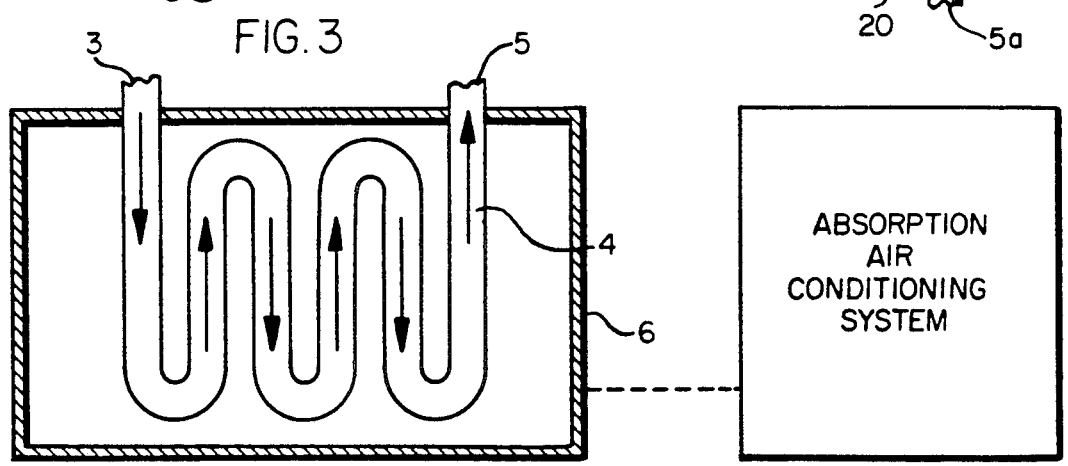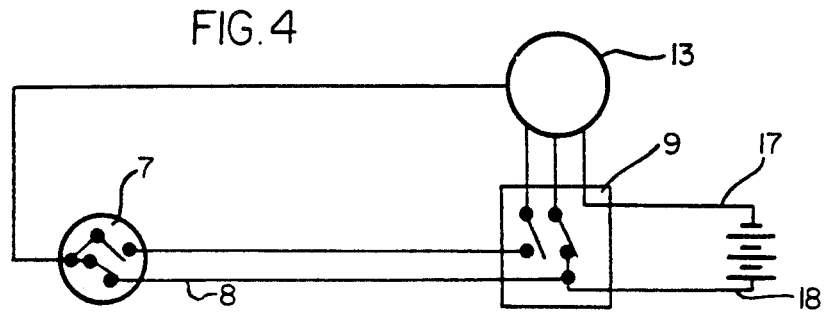

1

HEAT GENERATOR FOR USE WITH AN ABSORPTION AIRCONDITIONING SYSTEM FOR AUTOMOBILES

OBJECTS OF THE INVENTION

A broad object of the invention is to provide a simplified novel means of providing an airconditioning system for automobiles, where the apparatus is highly efficient from the standpoint that it obtains its power from the wasted exhaust heat of the catalytic converter.

Another broad object of the invention is to provide a means by which the conventional compressor can be eliminated, thus removing the horsepower drain from the engine and saving fuel.

Another object is to provide a novel heat generator with temperature controls and means of transferring the heat to the airconditioning apparatus.

An additional object is to provide a heat generator having a novel arrangement of parts to control the distance between the generator and catalytic converter thereby efficiently controlling the heat.

Still another object is to provide a heat generator with flexible heat fluid transfer lines to simplify the arrangement of the apparatus and also allowing the line to flex when the apparatus changes position.

Still another objective is to provide a novel method of utilizing and transferring wasted heat.

DESCRIPTION OF THE PREFERRED EMBODIMENTS

In the drawings:

FIG. 1 is a perspective view of the invention, including the heat generator, thermostat, control switch electric lines and motor apparatus to control temperature, including mounting apparatus and heating fluid inlet and outlet lines.

FIG. 2 is a cut away view of the heat generator showing direction of flow and placement of thermostat.

FIG. 3 is a sectional view of the heating coil by which heat will be transferred to the generator on the refrigeration unit.

FIG. 4 is a diagram showing the electric circuit utilized for the apparatus.

FIG. 5 is an overall view of the circulation pump showing inlet and outlet ports and electrical connections.

Referring in detail to the drawings, attention is directed first to FIG. 1 showing an overall view of the heat generator designated as 1 which is connected by mechanical mounting means 2 to the catalytic converter of an automobile. Heat transfer then takes place, heating fluid in generator 1 forcing heated fluid out of line 3 into heating coil designated as 4 associated with an absorption air conditioning system as shown in FIG. 3. Fluid then passes through coil 4 and into line 5, out line 5 into suction port designated as 5A through circulation pump 21, powered by electrical connections 19 and 20 and out exhaust port 5B back into line 5 at heat generator 1. Coil 4 is in mounted insulated compartment 6 and mounted to a generator on refrigeration system in a conventional manner. Lines 5 and 3 are connected to coil 4 by a conventional flexible line. As heating fluid passes back to the heat generator 1 in FIG. 1, it is reheated and temperature is controlled by means of thermostat 7. When the mode of operation is in a heat cycle the thermostat sends a signal by means of internal switching device of conventional construction by means of line 8 to a two-way switching device of conventional construction designated at 9 sending power to line 10 and grounded at line 12, activating motor 13 and lowering the heat generator to the catalytic converter by means of a threaded screw apparatus 14 connected to motor shaft. Motor is mounted to the heat generator by means of bolts at 15 and 16. When the fluid reaches temperature the thermostat reverse current sending power to line 11 reversing the rotation of motor and raising generator 1. Power is supplied by battery by means of line 17 and grounded by line 18.

FIG. 2 shows the internal flow chamber of the heat generator 1 and the flow therethrough by means of arrows.

FIG. 3 shows the coil 4 mounted in insulated chamber connected to a conventional absorption system and direction of flow indicated by arrows.

FIG. 4 is a diagram showing the electric circuit utilized for the operation of the apparatus.

The arrangement shown and described above shows the heat generator apparatus for an absorption air conditioning system, to be used on automobiles, which has the distinct advantage of utilizing the wasted heat from the catalytic converter. One advantage of this is all that is required to operate an absorption air conditioning unit is heat, and the heat is supplied by the catalytic converter, simplyfying the function of this apparatus. Additionally, the costly compressor is eliminated and moving parts kept to a minimum.

A still further advantage is the overall efficiency and minimum electrical power requirement.

A further advantage is the method of air conditioning in that the absorption air conditioning apparatus in this invention does not rob the engine of vital horsepower, but utilizes a wasted power.

What is claimed is:

1. A heat generating and heat transferring apparatus utilizing waste heat from a motor vehicle catalytic converter comprising:
    a heat generator comprising a main tank holding heat transfer fluid and having inlet and outlet connections for said heat transfer fluid;
    fluid lines connected to said inlet and outlet connections transferring fluid to and from a coil associated with an apparatus which requires heat;
    means for controlling the temperature of said heat transfer fluid comprising a reversible electric motor mounted to said heat generator and connected to a threaded shaft projecting into a mechanical mounting means attached to said vehicle catalytic converter and thermostatic means for sensing the temperature of said heat transfer fluid and selectively activating said electric motor in a forward or reverse direction responsive to said fluid temperature and wherein said heat generator is selectively lowered into proximity and raised out of proximity with said catalytic converter.

2. The heat generating and heat transferring apparatus according to claim 1 further comprising a liquid pump to transfer fluid from said coil to said heat generator.

3. The heat generating and heat transferring apparatus according to claim 1, wherein said fluid lines are of a flexible type whereby location is made simple and any possible leaks are prevented due to fluid line rupture from movement.

4. The heat generating and heat transferring apparatus of claim 1, wherein said coil is located in an insulated compartment which serves as a heat source for an absorption air conditioning system.

* * * * *